(12) United States Patent
Vaudenay et al.

(10) Patent No.: US 7,499,542 B2
(45) Date of Patent: Mar. 3, 2009

(54) DEVICE AND METHOD FOR ENCRYPTING AND DECRYPTING A BLOCK OF DATA

(75) Inventors: Serge Vaudenay, Crissier (CH); Pascal Junod, Lausanne (CH)

(73) Assignee: Nagravision SA, Cheseaux-Sur-Lausanne (CH)

( * ) Notice: Subject to any disclaimer, the term of this patent is extended or adjusted under 35 U.S.C. 154(b) by 642 days.

(21) Appl. No.: 10/845,063

(22) Filed: May 14, 2004

(65) Prior Publication Data
US 2004/0247117 A1 Dec. 9, 2004

(30) Foreign Application Priority Data
May 23, 2003 (EP) .................... 03011696

(51) Int. Cl.
*H04L 9/28* (2006.01)
(52) U.S. Cl. .............. 380/28; 380/37; 380/45; 380/259
(58) Field of Classification Search .......... 380/28, 380/29, 37, 43–47, 259, 277
See application file for complete search history.

(56) References Cited

U.S. PATENT DOCUMENTS

| | | | |
|---|---|---|---|
| 5,214,703 A | | 5/1993 | Massey et al. |
| 5,623,549 A | * | 4/1997 | Ritter ..................... 380/37 |
| 5,727,062 A | * | 3/1998 | Ritter ..................... 380/37 |
| 5,825,886 A | * | 10/1998 | Adams et al. ............ 380/28 |
| 6,189,095 B1 | * | 2/2001 | Coppersmith et al. ..... 713/150 |
| 7,039,184 B2 | * | 5/2006 | Sano et al. ................ 380/42 |
| 2002/0025035 A1 | * | 2/2002 | Rivest et al. .............. 380/42 |
| 2002/0101986 A1 | * | 8/2002 | Roelse .................... 380/42 |

OTHER PUBLICATIONS

Twofish: A 128-Bit Block Cipher B. Schneier, J. Kelsey, D. Whiting, D. Wagner, C. Hall, N. Ferguson Jun. 15, 1998, pp. 1-68.*
Applied Cryptography, Second Edition: protocols, algorithms, and source code in C Bruce Schneier Copyright 1996.*
Shannon, Claude. "Communication Theory of Secrecy Systems", Bell System Technical Journal, vol. 28(4), pp. 656-715, Oct. 1949.*
S. Vaudenay, "On the Lai-Massey Scheme", Advances in Cryptology, ASIACRYPT'99. International Conference on the Theory and Applications of Cryptology and Information Security, Proceedings, Springer Verlag, Nov. 18, 1999, pp. 8-9, XP002265237.
Dong Hyeon Cheon, Sang Jin Lee, Jong In Lim, Sung Jae Lee, "New block cipher DONUT using pairwise perfect decorrelation," Progress in Cryptology—INDOCRYPT 2000, First International Conference in Cryptology in India, Proceedings (Springer Verlag, Lecture Notes on Computer Science vol. 1977), Dec. 13, 2000, pp. 1-9, XP002265238.
Idea NXT, Wikipedia, http://en.wikipedia.org/wiki/IDEA_NXT Jun. 18, 2005.

* cited by examiner

*Primary Examiner*—Nasser G Moazzami
*Assistant Examiner*—Rebecca L Pachura
(74) *Attorney, Agent, or Firm*—Harness, Dickey & Pierce

(57) ABSTRACT

The purpose of this invention is to propose a new encryption method which offers a high level of security combined with a high execution speed. This aim is achieved by a method to encrypt or decrypt blocks of data X to Y, based on a main key R, this method using several serially connected modules, each module using a sub-key RA derived from the main key R.

11 Claims, 5 Drawing Sheets

DEVICE AND METHOD FOR ENCRYPTING AND DECRYPTING A BLOCK OF DATA

PRIORITY STATEMENT

This application claims priority under 35 U.S.C. § 119 of European Patent Application No. 03011696.6, filed on May 23, 2003, in the European Patent Office, the entire contents of which are incorporated herein by reference.

BACKGROUND

1. Field of the Invention

The present invention refers to a device and a method for encrypting and decrypting a block of data known as a block cipher, the size of the input block and output block being the same.

This operation is controlled using a key which could either have the same size as the block or could have a different size, generally a larger size.

This invention refers to a symmetrical encryption/decryption method as opposed to the asymmetrical method. The symmetrical method is characterized by using the same key to encrypt and decrypt the data while the asymmetrical method uses a first key to encrypt and a second key to decrypt the data.

2. Description of the Related Art

Well known methods include DES (56 bit key), CAST (128-bit key), Blowfish (448-bit key), Twofish (256-bit key), and Rijndael (also known as AES, 256-bit key). Depending on the applications concerned, they have their own advantages and disadvantages.

Several patents have been published describing these methods. U.S. Pat. No. 5,214,703 describes the method known as IDEA™ which is based on a 8.5 rounds operations encryption process for 64 bits block length, each round using 6 sub-keys derived from the main key. The core is constituted by a Lai-Massey scheme using addition modulo $2^{16}$, multiplication modulo $2^{16}+1$ and bitwise excusive-OR.

The two major requirements for an encryption method is the robustness against any form of cryptanalysis and the computational speed. One key factor for the robustness is achieved by the diffusion effect, i.e. when one bit is changed in the input data, all the output bits are influenced in an unpredicted manner.

The computational speed is mainly determined by the type of mathematical and logical operations needed. More complex operations (division, multiplication) may prolong the time to execute the encryption process.

SUMMARY OF THE INVENTION

The purpose of this invention is to propose a new encryption method which offers a high level of security combined with a high execution speed.

This aim is achieved by a method to encrypt or decrypt blocks of data X to Y, based on a main key R, this method using several serially connected modules, each module using a sub-key RA derived from the main key R and comprising the steps of:

inputting at least two initial values X0L and X0R, mixing the at least two values X0L and X0R to form a mixed value X1, obtaining a value X2 by mixing a first part RAH of the sub-key RA with the value X1, obtaining a value X3 by applying the value X2 to a substitution layer, the substitution layer comprising at least one substitution box (sbox), each substitution box containing at least one table of constants for which the input serves as the pointer and the pointed constant serves as the output, obtaining a value X4 by using a diffusion box of multi-permutation type based on the value X3, obtaining a value X5 by mixing a second part RAL of the sub-key RA with the value X4, obtaining the value X6 by applying to the value X5 a substitution layer, obtaining a value X7 by mixing a first part RAH of the sub-key RA with the value X6, mixing the value X7 with the initial at least two values X0L and X0R to obtain the at least two values X8L and X8R, X8L and X8R representing the output value X8 of the module, this method using at least two modules, where for each module a new sub-key RA is generated from the main key R, the initial values X0 of the first module being a division of the input data X, the output values X8L and X8H of the last module forming the output data Y, and this method further comprising the step of applying to at least one of the value X8L or X8R an orthomorphism function before applying these values to the input X0R and X0L of the next module.

The two main parts of the method are the substitution layer and the multi-permutation matrix.

The purpose of the substitution layer is to transform the input value to an output value without a simple algebraic relationship. One very efficient way to implement such a substitution layer consists in using a table containing constants, which can achieve the expected confusion result, as well as a table-lookup strategy.

Since in this embodiment the input data has a length of 32 bits, the number of constants will be $2^{32}$ values each of a 32 bit length.

According to a preferred embodiment, the input data is split in groups of 8-bit lengths thus reducing the number of constants to 256 bytes.

Then the input data of 32 bits or 64 bits is divided in bytes of 8 bits and applied to the substitution box to obtain an output of 8 bits. The input data is used as an address pointer and the constant pointed to is the output.

Depending on the implementation method, the constant tables are the same for all groups of the input data (32 bit or 64 bit). In another embodiment, the constant tables are different for each group of the input data.

The constants stored in this table are a fixed permutation of numbers which are all different, encoded by a number of bits equal to the table width.

The second main part of the method is the multi-permutation matrix. The multi-permutation matrix is a square matrix with the property that every possible square sub-matrix has a determinant different than zero; and the elements of the matrix are elements of a finite field. The mixing operation consists in multiplying a vector of input elements by the matrix, resulting in a vector which is defined to be the output.

DETAILED DESCRIPTION OF THE INVENTION

Figure 1:
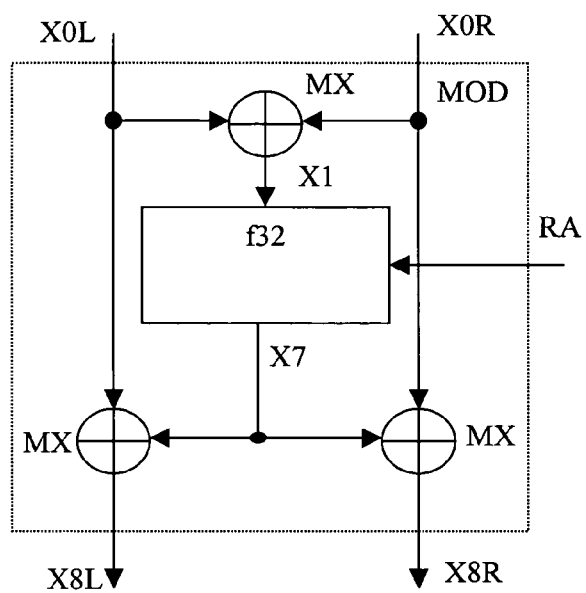
FIG. 1 shows the block diagram of the main module in the 64 bit version.

FIG. 1 shows the skeleton of the encryption (or decryption) process which represents the module MOD. The entry data X0 of 64 bits, which is represented in two parts X0L and X0R of 32 bits each, are first mixed within the mixing element MX to obtain the X1 value. This mixing element aims to provide a 32 bit image of two times 32 bits of data. This could be achieved in different ways such as using X0R function, addition with modulo, or by using any group law.

The next step is illustrated with the block f32 which has a 32 bit input X1 and a 32 bit output X7 as well as using a sub-key RA. The detailed description of this block is given with reference to FIG. 3 (see below).

The output X7 of the block f32 is applied to the two mixing blocks MX which are connected with the two entries X0L and X0H.

The resulting data X8L and X8R represent the two 64 bits output X8 of the module MOD.

Figure 2:
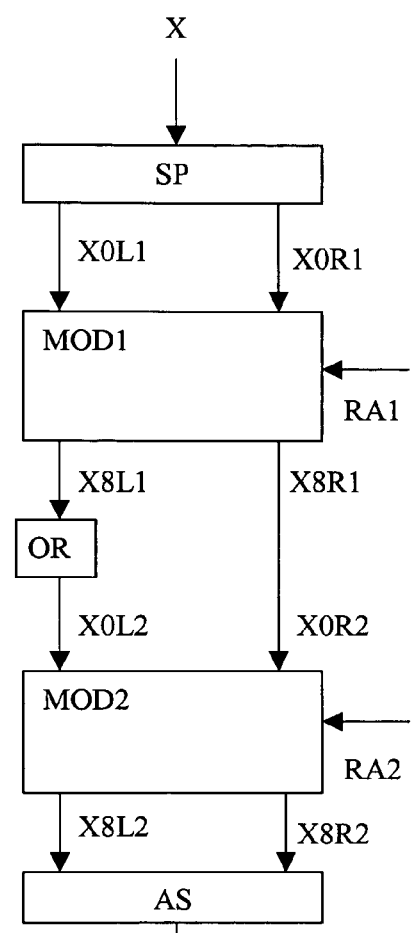
FIG. 2 shows the main process including an example with two modules.

FIG. 2 shows the whole process using at least two modules MOD. The input data X is first applied to a splitting module SP which converts the 64 bit entry X into two output values X0L1 and X0R1, each of 32-bit length.

The function of this splitting module SP could be achieved in different ways such as selecting the lowest bits for X0L1 and the highest bits for X0R1, or every odd bit for X0L1 and even bit for X0R1. Other methods of dividing the input data X could be used as long as all the bits of X are comprised in X0L1 and X0R1.

The outputs X0L1 and X0R1 are then used as entries in the first module MOD1. This first module processes the data while using a first sub-key RA1. The processing for X0L1 and X0R1 is the same as described according to FIG. 1. The outputs of this first module MOD1 are two outputs X8L1 and X8R1. An orthomorphism function is applied to one of these outputs, for example X8L1 as illustrated on FIG. 2. The output resulting from this orthomorphism function is referenced as X0L2. The other value X8R1 resulting from the processing by the first module MOD1 is used as input, as well as the output X0L2 resulting from the orthomorphism function, in a second processing module MOD2. This second module MOD2 will process their input data based on a second sub-key RA2. The outputs of this second module are referenced as X8L2 and X8R2 on FIG. 2. These outputs are assembled to form the encrypted data Y within the assembler module AS. This module AS has the same function as the splitting module SP but works inversely. It is to be noted that the manner to rebuild the output Y could be different than the splitting module SP but the aim remains the same. All bits of X8L2 and X8R2 should be present in the output Y.

Figure 3:
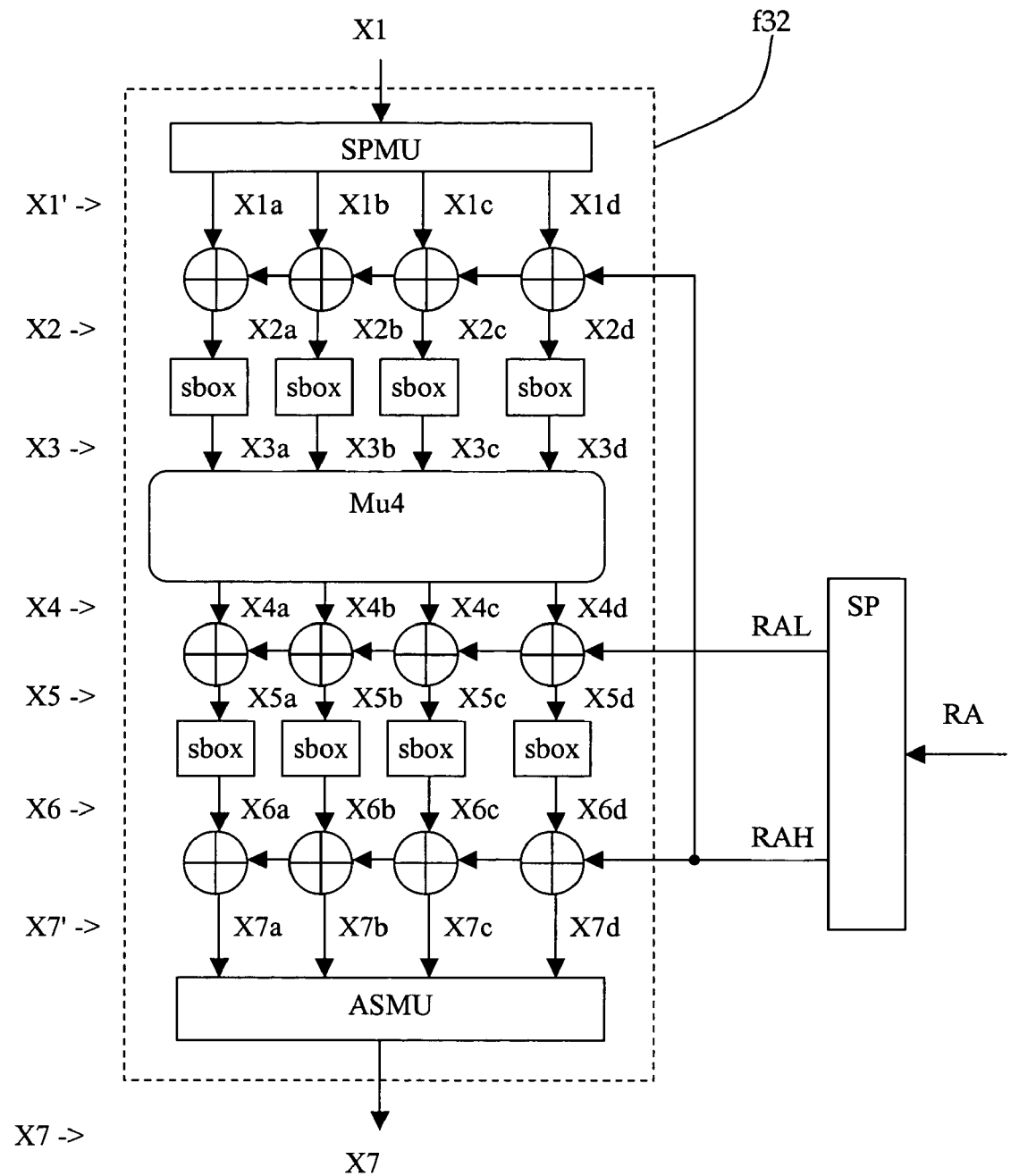
FIG. 3 shows the internal part of the main module, in the 64 bit version.

FIG. 3 shows in detail, the functions of the block f32 of FIG. 1. In this block, a 32-bit length data X1 is the input. This data is separated into blocks of 8-bit length (X1a, X1b, X1c, X1d) through a splitting block SPMU, also mentioned X1' in FIG. 3. This block has the same function as the one described in respect of the block SP of FIG. 2. Each of these 8-bit blocks are mixed with a first part RAH of the sub-key RA to obtain a value X2a, X2b, X2c, X2d (forming the value X2). This mixing operation is the same as the one described in respect with the block MX of FIG. 1.

The generation of the two sub-keys RAH and RAL is made through the splitting module SP. This module has the same function as the one described in FIG. 1.

Each of these values X2a to X2d are applied to a substitution layer, comprising at least one substitution box (sbox), each substitution box containing a table of constants for which the input serves as the pointer and the constant pointed to serves as the output. The output data is referenced as X3a, X3b, X3c, X3d (forming the value X3) on FIG. 3.

One method to generate this constant table is to use a pseudorandom generator. One should remove all duplicate values so that each constant in this table is unique.

This data is introduced in a diffusion box Mu4 of (4,4) multi-permutation type. The output data of this diffusion box is referenced as X4a, X4b, X4c, X4d respectively (forming the value X4). The diffusion box consists in multiplying the input vector (X3a, X3b, X3c, X3d) by a square matrix 4×4 Mu4, whose elements belong to the finite field with 256 elements; these elements are denoted Mu(i, j), where i refers to the row index and j to the column index. The result of the multiplication of the vector (X3a, X3b, X3c, X3d) by the matrix Mu4 is a vector (X4a, X4b, X4c, X4d) where these values are obtained as follows:

$$X4a = Mu4(1,1)*X3a + Mu4(1,2)*X3b + Mu4(1,3)*X3c + Mu4(1,4)*X3d$$

$$X4b = Mu4(2,1)*X3a + Mu4(2,2)*X3b + Mu4(2,3)*X3c + Mu4(2,4)*X3d$$

$$X4c = Mu4(3,1)*X3a + Mu4(3,2)*X3b + Mu4(3,3)*X3c + Mu4(3,4)*X3d$$

$$X4d = Mu4(4,1)*X3a + Mu4(4,2)*X3b + Mu4(4,3)*X3c + Mu4(4,4)*X3d$$

Here "+" denotes the addition in the finite field and "*" its multiplication. The elements of Mu4 are chosen such that the amount of computations needed to evaluate the four above expressions is minimal. The number of multiplications by the constant "1" (thereafter denoted "identities") has therefore been chosen to be as large as possible.

The data is then mixed with a second part RAL of the sub-key RA to obtain a value X5a, X5b, X5c, X5d (forming the value X5).

Each of these values X5a to X5d is then applied to a substitution box (sbox) to obtain a value X6a, X6b, X6c, X6d (forming the value X6). These values are mixed with a first part RAH of the sub-key RA to obtain new values X7a, X7b, X7c, X7d (forming the value X7).

Then these values X7a, X7b, X7c, X7d are assembled to form the output data X7 within the assembler module AS as described in respect with FIG. 2. This data corresponds to the output data X7 of block f32 in FIG. 1

During the encryption process, the main key R is divided into several sub-keys, one per module MOD. In the example of FIG. 3, the first sub-key RA1 is used in combination with the module MOD1 and the second sub-key RA2 is used in combination with the module MOD2.

To obtain the data X based on the data Y and the key R, the same process as described in the reference to FIG. 3 is applied with the only difference that the sub-keys are generated in the reverse order. The sub-key RA2 is then applied to the first module MOD1 and the sub-key RA1 is applied to the second module MOD2.

According to the general principle of this invention, the number of serially connected modules MOD is not limited to two modules. In order to achieve a good robustness, experience has shown that 9 rounds are optimal to obtain a result which could be qualified as an encryption process. This number could be extended to 12 or more in order to obtain more robustness.

Figure 4:
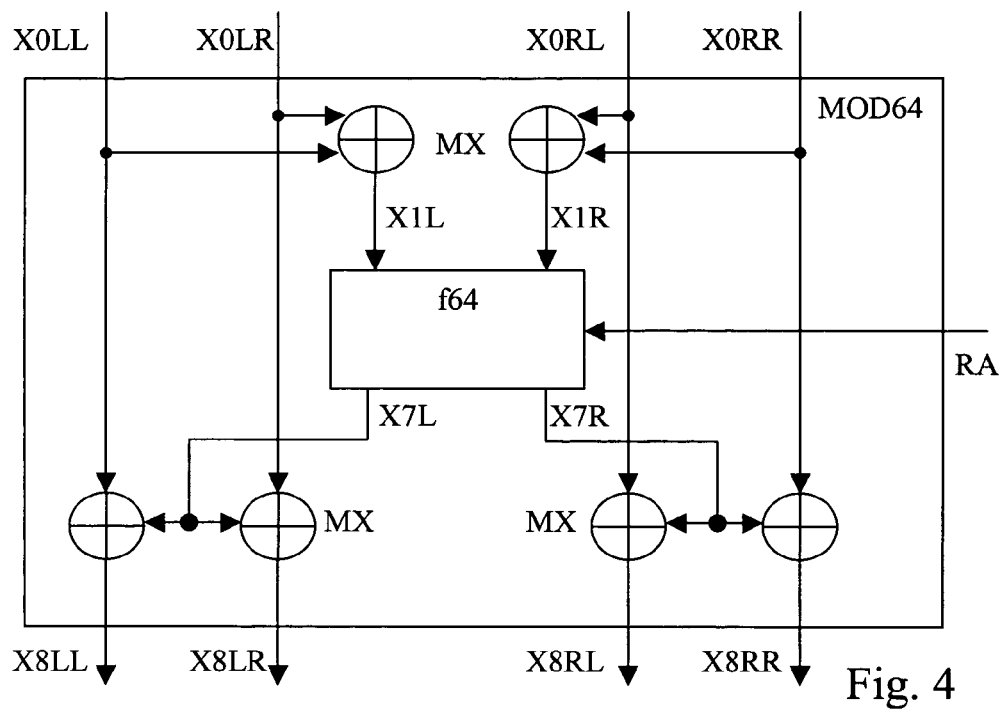
FIG. 4 shows the block diagram of the main module in the 128 bit version.

FIG. 4 describes an embodiment of the module MOD64 designed for processing 128-bit length data. The inputs X0LL and X0LR are mixed together within the mixing element MX to form the output value X1L and in the same manner, the values X0RL and X0RR are mixed together to form the value X1R.

The next step is illustrated with the layer f64 which has two 32 bits input X1L and X1R and two 32 bits output X7L and X7R as well as using a sub-key RA. The detailed description of this block is given with the reference to FIG. 7 (see below).

Each of these outputs is mixed with two input data of the module MOD64 within the same mixing element MX. In our example, the output value X7L is mixed with the input X0LL and X0LR respectively and the output value X7R is mixed with the input X0RI and X0RR respectively. Other mixing combinations are also possible, such as mixing the output value X7L with X0LL and X0RR in a cross configuration.

Figure 5:
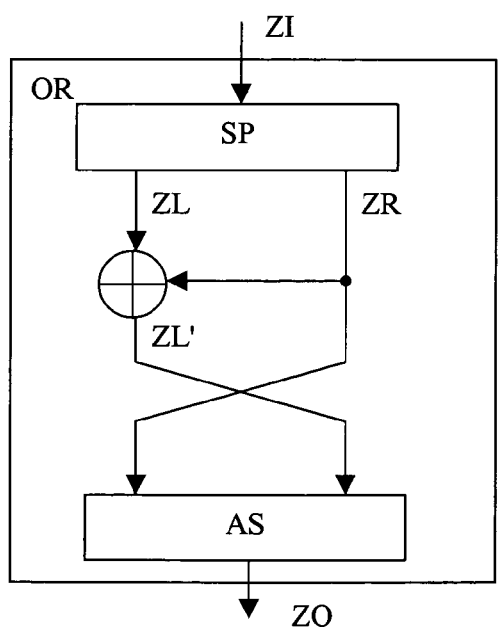
FIG. 5 shows the block diagram of the orthomorphism function.

FIG. 5 is an illustration of an embodiment of the orthomorphism function. The input data is noted ZI and the output data is noted ZO. The data length is not an issue for this function. The input data ZI is first divided into two values ZL and ZR of the same size with the splitting module SP. Then the two values are mixed with the so called MX mixing element and the output of the element is applied to the assembler unit AS. The other split value ZR is directly applied to the assembler module AS without modification. This module comprises two inputs and combines these data to form the output value ZO. This module works inversely than the splitting module SP. The particularity of this embodiment is that the inputs of the assembler module are crossed relative to the outputs of the splitting module SP. The right output ZR of the splitting module SP is applied to the left input of the assembler module AS and the left output ZL of the splitting module SP, after being mixed with the other output of the splitting module SP, is applied to the right input of the assembler module AS.

As far as the substitution box is concerned, there exist different possibilities to realize this function. We have previously described a method uniquely based on a constant table. The first step to reduce the table size is to split the input and to apply this part to a much smaller table.

The example of FIG. 3 shows a substitution box working with 8-bit data length thus embedding a table of 256 constants.

In some cases, in particular where the memory size is an issue, other alternatives are sought. Such alternative is described in reference to FIGS. 6 and 9.

Figure 6:
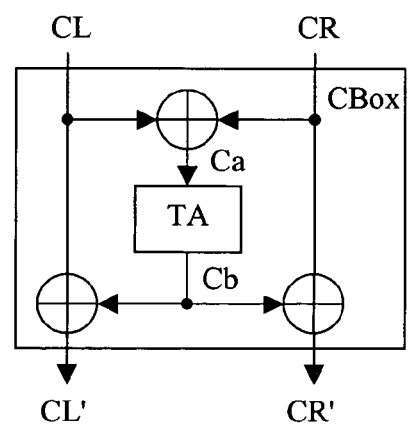
FIG. 6 shows the sub-system for the generation of the substitution box.

FIG. 6 shows a subsystem Cbox of this substitution box, this subsystem comprising one input C divided into two inputs CL and CR and two outputs CL' and CR'.

The heart of this subsystem is the module TA which comprises a constant table of $2^{(n/2)}$ elements, each of n/2 bits, in which n is the length of the input value C.

For an input having a length of 8 bits, the constant table comprises 16 ($2^4$) elements, each of 4-bit length. These elements are randomly generated, taking into account that each element has a unique value.

Figure 9:
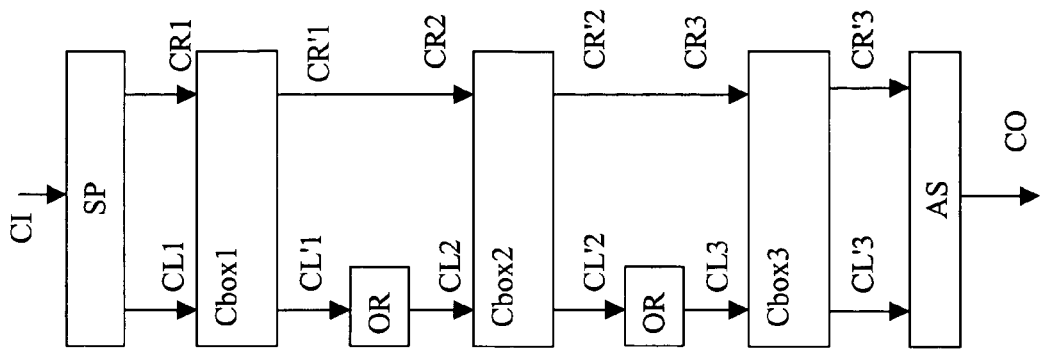
FIG. 9 shows an alternative version of the substitution box.

FIG. 9 describes how to use the module Cbox to build a substitution box. The input value C1 is first split into two parts CL1 and CR1 and applied to the first module Cbox1 as described with reference to FIG. 6. The output of said module Cbox1 is forwarded to the next module Cbox2. One of the outputs of the first module, in this case CL1', prior to applying to the second module Cbox2, is given to an orthomorphism function OR.

The execution of the substitution box uses generally at least two subsystems Cbox, each having a different constant table TA. In the illustrated example, the substitution box is made using three subsystems Cbox and the outputs of the last subsystem has no orthomorphism function OR according to the embodiment.

Figure 7:
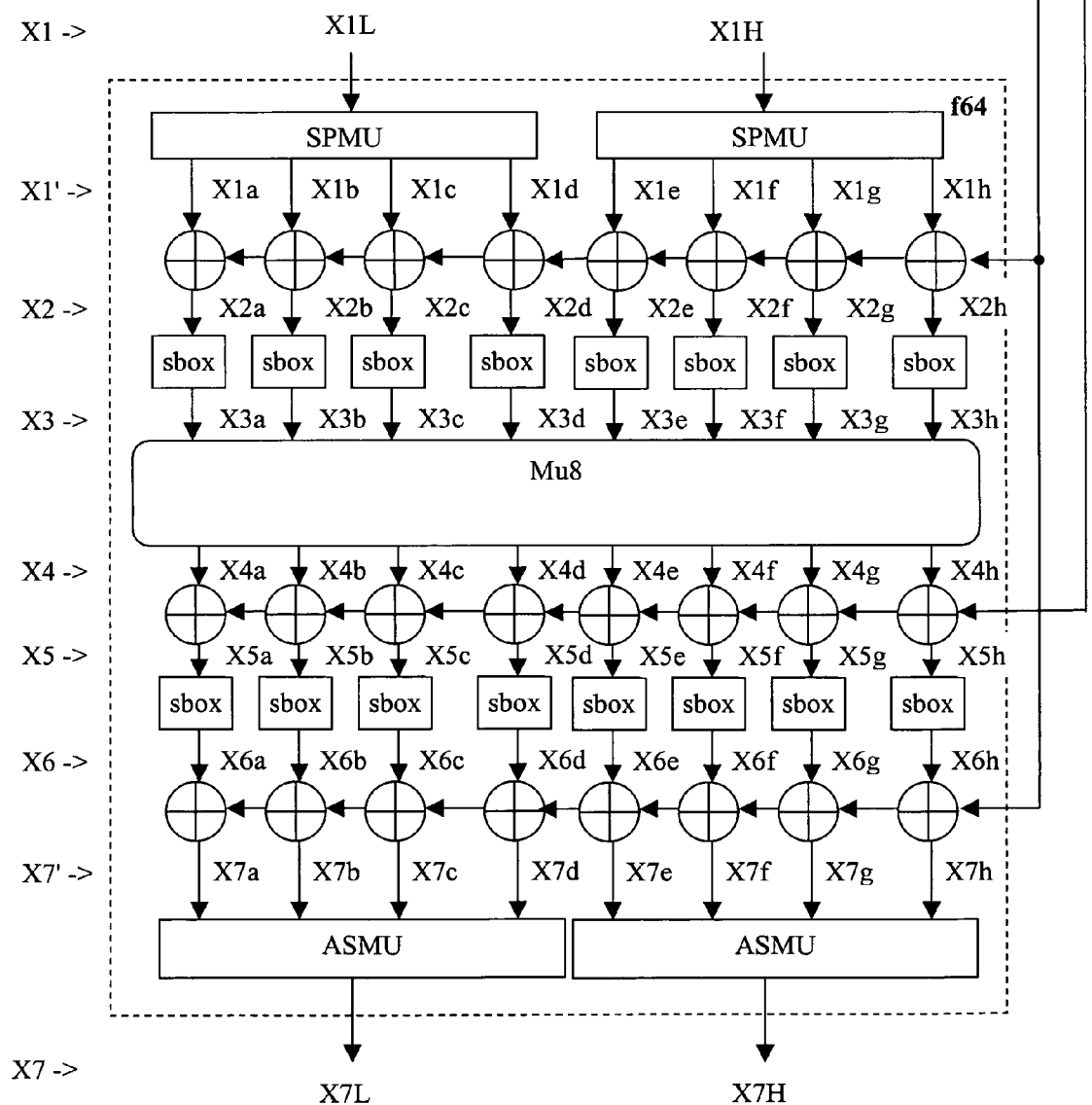
FIG. 7 shows the internal part of the main module, in the 128 bit version.

FIG. 7 is an alternative of the embodiment described in FIG. 6, designed for data of 64-bit length. The structure designed for 32 bits is largely duplicated to proceed 64-bit of data. The input data X1 is divided into a vector with elements of 8-bit length (X1$a$ to X1$h$) and processed in the same manner as described in FIG. 6. The main difference is in the diffusion box Mu8 which is a square matrix of 8×8 elements of the finite field with 256 elements. The elements of the matrix are denoted Mu8(i, j), where i refers to row index and j to the column index. For an input vector (X3$a$, ..., X3$h$), the multiplication by the matrix Mu8 gives the output vector (X4$a$, ..., X4$h$) in the following way ("+" is the addition and "*" is the multiplication in the finite field):

$$X4a = Mu8(1,1)*X3a + Mu8(1,2)*X3b + Mu8(1,3)*X3c + Mu8(1,4)*X3d + Mu8(1,5)*X3e + Mu8(1,6)*X3f + Mu8(1,7)*X3g + Mu8(1,8)*X3h;$$

$$X4b = Mu8(2,1)*X3a + Mu8(2,2)*X3b + Mu8(2,3)*X3c + Mu8(2,4)*X3d + Mu8(2,5)*X3e + Mu8(2,6)*X3f + Mu8(2,7)*X3g + Mu8(2,8)*X3h;$$

$$X4c = Mu8(3,1)*X3a + Mu8(3,2)*X3b + Mu8(3,3)*X3c + Mu8(3,4)*X3d + Mu8(3,5)*X3e + Mu8(3,6)*X3f + Mu8(3,7)*X3g + Mu8(3,8)*X3h;$$

$$X4d = Mu8(4,1)*X3a + Mu8(4,2)*X3b + Mu8(4,3)*X3c + Mu8(4,4)*X3d + Mu8(4,5)*X3e + Mu8(4,6)*X3f + Mu8(4,7)*X3g + Mu8(4,8)*X3h;$$

$$X4e = Mu8(5,1)*X3a + Mu8(5,2)*X3b + Mu8(5,3)*X3c + Mu8(5,4)*X3d + Mu8(5,5)*X3e + Mu8(5,6)*X3f + Mu8(5,7)*X3g + Mu8(5,8)*X3h;$$

$$X4f = Mu8(6,1)*X3a + Mu8(6,2)*X3b + Mu8(6,3)*X3c + Mu8(6,4)*X3d + Mu8(6,5)*X3e + Mu8(6,6)*X3f + Mu8(6,7)*X3g + Mu8(6,8)*X3h;$$

$$X4g = Mu8(7,1)*X3a + Mu8(7,2)*X3b + Mu8(7,3)*X3c + Mu8(7,4)*X3d + Mu8(7,5)*X3e + Mu8(7,6)*X3f + Mu8(7,7)*X3g + Mu8(7,8)*X3h;$$

$$X4h = Mu8(8,1)*X3a + Mu8(8,2)*X3b + Mu8(8,3)*X3c + Mu8(8,4)*X3d + Mu8(8,5)*X3e + Mu8(8,6)*X3f + Mu8(8,7)*X3g + Mu8(8,8)*X3h;$$

Figure 8:
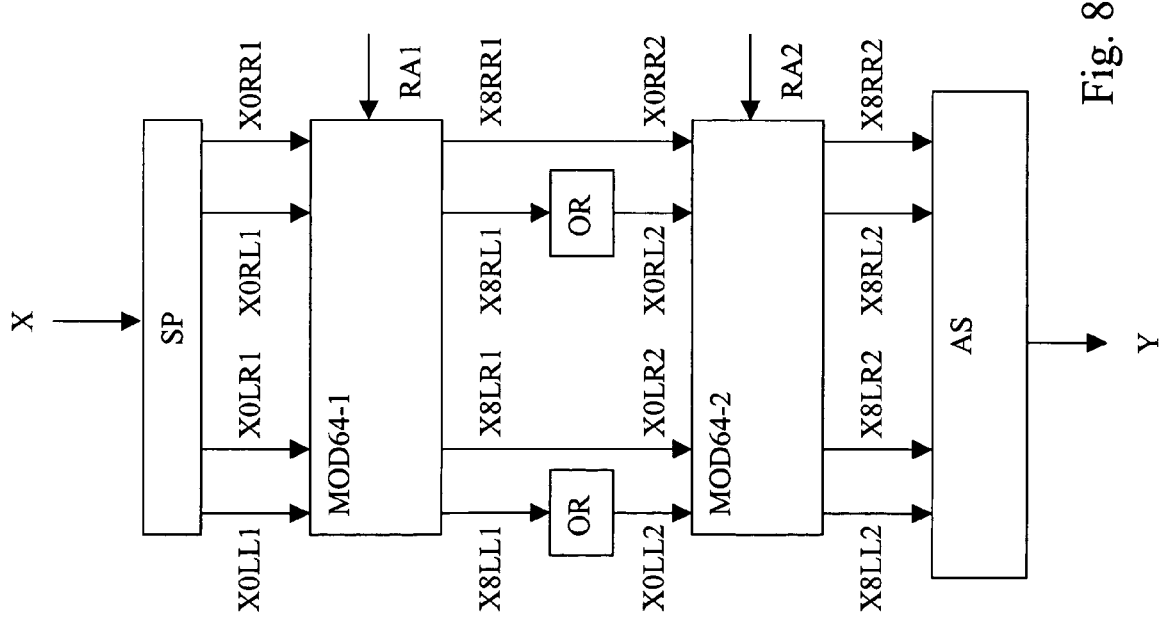
FIG. 8 shows the main process including an example with two modules in the 128 bit version.

FIG. 8 describes the complete process using two rounds of execution of the module MOD64. The splitting module SP divides the 128-bit length input data X in four parts, namely X0LL1, X0LR1, X0RL1 and X0RR1 (forming the value X0). Two parts of the result of the module MOD64-1 are then applied to an orthomorphism function OR, before being used as input of the next module MOD64-2.

The position of the orthomorphism function OR with regard to the outputs of the module MOD64 is not decisive. One can select the two left outputs of the two right outputs depending of the implementation of this method.

The output Y is directly obtained from the last module MOD64, without having an orthomorphism function OR in one of these outputs.

In the case that more than two modules MOD64 are used, the orthomorphism function OR is placed between each module MOD64. Even if in the preferred embodiment the position of the orthomorphism function OR is the same regardless of the module number, in another embodiment, the position of these orthomorphism function OR can be changed to be connected to a different output of the module MOD64.

The invention claimed is:

1. A method to encrypt or decrypt blocks of input data X to output data Y, based on a main key R, this method using at least two serially connected main modules (MOD), each main module (MOD) using a sub-key (RA) derived from the main key (R), comprising the steps of:

splitting X into at least two initial values X0L and X0R, inputting at a device, the at least two initial values X0L and X0R, mixing the at least two values X0L and X0R to form a mixed value X1, obtaining a value X2 by mixing a first part RAH of the sub-key RA with the value X1, obtaining a value X3 by applying the value X2 to a substitution layer, the substitution layer comprising at least one substitution box (sbox), each substitution box containing a table of constants for which an input serves as a pointer and a pointed constant serves as an output, obtaining a value X4 by using a diffusion box of multi-permutation type based on the value X3, obtaining a value X5 by mixing a second part RAL of the sub-key RA with the value X4, obtaining a value X6 by applying to the value X5 another substitution layer, the substitution layer also comprising at least one substitution box (sbox), obtaining a value X7 by mixing a first part RAH of the sub-key RA with the value X6, mixing the value X7 with the initial at least two values X0L and X0R to obtain at least two values X8L and X8R, the at least two values X8L and X8R representing an output value X8, where for each main module (MOD) a new sub-key (RA) is generated from the main key (R), the at least two initial values X0L and X0R of a first module being a subset of the input data X, the at least two output values X8L and X8R of a last module forming the output data Y producing an encryption or decryption result, and this method further comprising the step of applying to at least one of the values X8L or X8R an orthomorphism function before applying these values to the input X0R and X0L of a next main module.

2. The method of claim 1, wherein the input data X is of 64 bits length and the input data X is divided into two initial values X0L and X0H of 32 bit length, and the two output values X8L and X8H form the output data Y.

3. The method of claim 1, wherein the input data X is of 128 bit length and the input data X is divided into four initial values X0LL, X0LR, X0RL and X0RR of 32 bit length, and four output values X8LL, X8LR, X8RL and X8RR that form the 128 bits output data Y, a first part X1L of the value X1 is obtained by mixing the value X0LL with X0LR and a second part X1R of the value X1 is obtained by mixing the value X0RL with X0RR, a first part X7L of the value X7 is mixed with two of the four initial values X0LL, X0LR, X0RL and X0RR and a second part X7R of the value X7 is mixed with the two other parts of the initial values X0LL, X0LR, X0RL and X0RR.

4. The method of claim 1, wherein at least one substitution layer comprises several substitution boxes (sbox), each box having an 8-bit input and an 8-bit output, the input of the substitution layer being divided into parts of 8-bit length.

5. The method of claim 4, wherein the table of constants (TA) of the substitution box (sbox) contains for a given input a unique output.

6. The method of claim 4, wherein the table of constants for each substitution box (sbox) is the same.

7. The method of claim 4, wherein the table of constants for each substitution box (sbox) is different.

8. The method of claim 4, wherein the table of constants of the substitution box (sbox) is changed at each main module execution.

9. The method of claim 1, wherein the data length is 64 bits and the diffusion box is a matrix function X4=M*X3, the argument M defining 4*4 additions, multiplications by a constant, or identities, of which at least one row and one column comprise three identities.

10. The method of claim 9, wherein the remaining rows and remaining columns of the argument M comprise two identities.

11. The method of claim 1, wherein the data length is 128 bits and the diffusion box is a matrix function X4=N*X3, the argument N defining 8*8 additions, multiplications by a constant, or identities, of which at least one row and one column comprise seven identities.

* * * * *